(12) United States Patent
Kamiya (10) Patent No.: US 7,674,510 B2
(45) Date of Patent: Mar. 9, 2010

(54) FIBER FABRIC AND COMPOSITE MATERIAL

(75) Inventor: Ryuta Kamiya, Kariya (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 321 days.

(21) Appl. No.: 11/449,250

(22) Filed: Jun. 8, 2006

(65) Prior Publication Data

US 2007/0202295 A1 Aug. 30, 2007

(30) Foreign Application Priority Data

Jun. 10, 2005 (JP) ............... 2005-171407

(51) Int. Cl.
*B32B 3/06* (2006.01)
*B32B 5/12* (2006.01)

(52) U.S. Cl. ............ 428/103; 428/105; 428/107; 428/111; 428/112; 428/113; 442/205

(58) Field of Classification Search ......... 428/107, 428/111, 109; 442/203, 204, 205, 206, 207
See application file for complete search history.

(56) References Cited

U.S. PATENT DOCUMENTS

| | | | | |
|---|---|---|---|---|
| 3,895,835 | A | | 7/1975 | Thomson ............ 293/71 R |
| 4,622,254 | A | * | 11/1986 | Nishimura et al. ........ 428/102 |
| 5,952,067 | A | * | 9/1999 | Head ............... 428/36.3 |
| 2004/0219851 | A1 | | 11/2004 | Sahlin et al. .......... 442/254 |
| 2005/0006881 | A1 | | 1/2005 | Charpentier .......... 280/730.2 |
| 2005/0059309 | A1 | * | 3/2005 | Tsotsis .............. 442/381 |

FOREIGN PATENT DOCUMENTS

| | | |
|---|---|---|
| EP | 0 612 644 A2 | 8/1994 |
| EP | 0 612 644 A3 | 8/1994 |
| EP | 1 553 323 A2 | 7/2005 |
| EP | 1 553 323 A3 | 10/2005 |
| GB | 2 241 207 | 8/1991 |
| JP | 63-303145 | 12/1988 |
| JP | 7-243147 | 9/1995 |
| JP | 7-243149 | 9/1995 |
| JP | 2003-182513 | 7/2003 |

OTHER PUBLICATIONS

European Search Report for counterpart application (dated Oct. 4, 2006).

* cited by examiner

*Primary Examiner*—Jennifer A Chriss
(74) *Attorney, Agent, or Firm*—Locke Lord Bissell & Liddell LLP (57) ABSTRACT

A fiber fabric includes a first fiber layer formed of a plurality of first fiber bundles, a second fiber layer formed of a plurality of second fiber bundles, a retaining thread group formed of a plurality of retaining threads, and a constraint thread group formed of a plurality of constraint threads. The first fiber layer is laminated in adjacent to the second fiber layer. The first fiber bundles diagonally intersect the second fiber bundles at an angle of 45 degrees. Accordingly, it is possible to improve a production efficiency of an overlapped sheet which gives excellent moldability and a strength, and has an increased thickness by overlapping the fiber fabrics.

6 Claims, 9 Drawing Sheets

FIBER FABRIC AND COMPOSITE MATERIAL

BACKGROUND OF THE INVENTION

The present invention relates to a fiber fabric and a composite material obtained by reinforcing a resin by the fiber fabric.

A load energy absorbing member constructing a bumper apparatus cushioning an impact at a collision of a vehicle absorbs the energy of an impact load applied to a bumper reinforcement constructing the bumper apparatus. In order to save weight of the bumper apparatus, there has been known a composite material in which the bumper reinforcement or the load energy absorbing member is formed by a fiber reinforced resin.

As the fiber for reinforcing the resin, for example, fabrics disclosed in the following publication can be employed.

A fabric disclosed in Japanese Laid-Open Patent Publication No. 63-303145 is structured such that the weft is diagonally woven in the warp. However, since the fabric is woven only by the warp and the weft, threads are bent and meander, and it is disadvantageous in view of improving the strength of the composite material.

In a fabric disclosed in Japanese Laid-Open Patent Publication No. 7-243147, the structure is made such that two perpendicular lines passing through the center of two warp threads or two weft threads adjacent to each other is connected the centerline of one of the warp and the weft, which intersect each other. An angle formed between the connecting line and a line which is in parallel to an arranging direction of the warp or the weft is set to be equal to or less than 1 degrees. That is, a crimp of the threads is small. However, in the case that the crimp exists although it is small, it is disadvantageous for improving the strength of the composite material.

In a fabric disclosed in Japanese Laid-Open Patent Publication No. 7-243149, an auxiliary thread group intersecting a flat reinforced fiber multi filament threads which do not have such a bending that a stress is concentrated is arranged in both sides of a sheet surface of a filament group in which the reinforced fiber multi filament threads are arranged in parallel to each other in one direction and in a sheet shape. Further, a warp direction auxiliary thread group and a weft direction auxiliary thread group keeping pace with the reinforced fiber multi filament thread form a woven texture and integrally hold the filament group. In this fabric, since the flat reinforced fiber multi filament threads are arranged in parallel to each other in one direction and in the sheet shape, the filament group with no crimp can be structured. Accordingly, the fabric is advantageous in view of improving a strength of the composite material and gives excellent moldability.

In order to increase the thickness of a composite material, it is preferable to overlap a plurality of fabrics. However, since the fabric in the Japanese Laid-Open Patent Publication No. 7-243149 is the fabric having a single layer sheet shape, the production efficiency in the case of producing the composite material having a large thickness is not good.

SUMMARY OF THE INVENTION

Accordingly, it is an objective of the present invention to provide a fiber fabric which has excellent moldability and strength, and improves the production efficiency of an overlapped sheet the thickness of which is increased by overlapping the fiber fabrics, and to a composite material made of a fiber reinforced resin using the fiber fabric.

In order to achieve the object mentioned above, the present invention provides a fiber fabric. The fiber fabric has a first fiber layer formed of a plurality of first fiber bundles having mutually aligned length directions, and a second fiber layer formed of a plurality of second fiber bundles having mutually aligned length directions. The length direction of the second fiber bundle obliquely interests the first fiber bundle. The fiber fabric further has a retaining thread group formed of a plurality of retaining threads having mutually aligned length directions, and a constraint thread group formed of a plurality of constraint threads having mutually aligned length directions. The length direction of the constraint thread intersects the retaining thread. The first fiber layer is laminated in adjacent to the second fiber layer. The retaining thread group and the constraint thread group form a fabric texture, and hold the first fiber layer and the second fiber layer.

Further, the present invention provides a composite material provided with the fiber fabric and a resin reinforced by the fiber fabric.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

PREFERABLE EMBODIMENT FOR CARRYING OUT THE INVENTION

A description will be given of a first embodiment according to the present invention on the basis of FIGS. 1A to 5B.

Figure 1A:
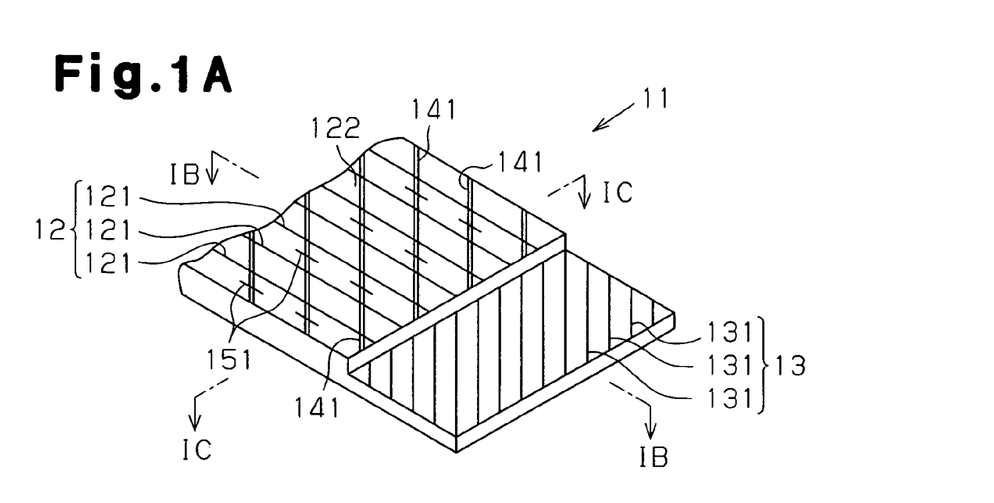
FIG. 1A is a partially cut away schematic perspective view of a fiber fabric in accordance with a first embodiment according to the present invention.
Figures 1B, 1C:
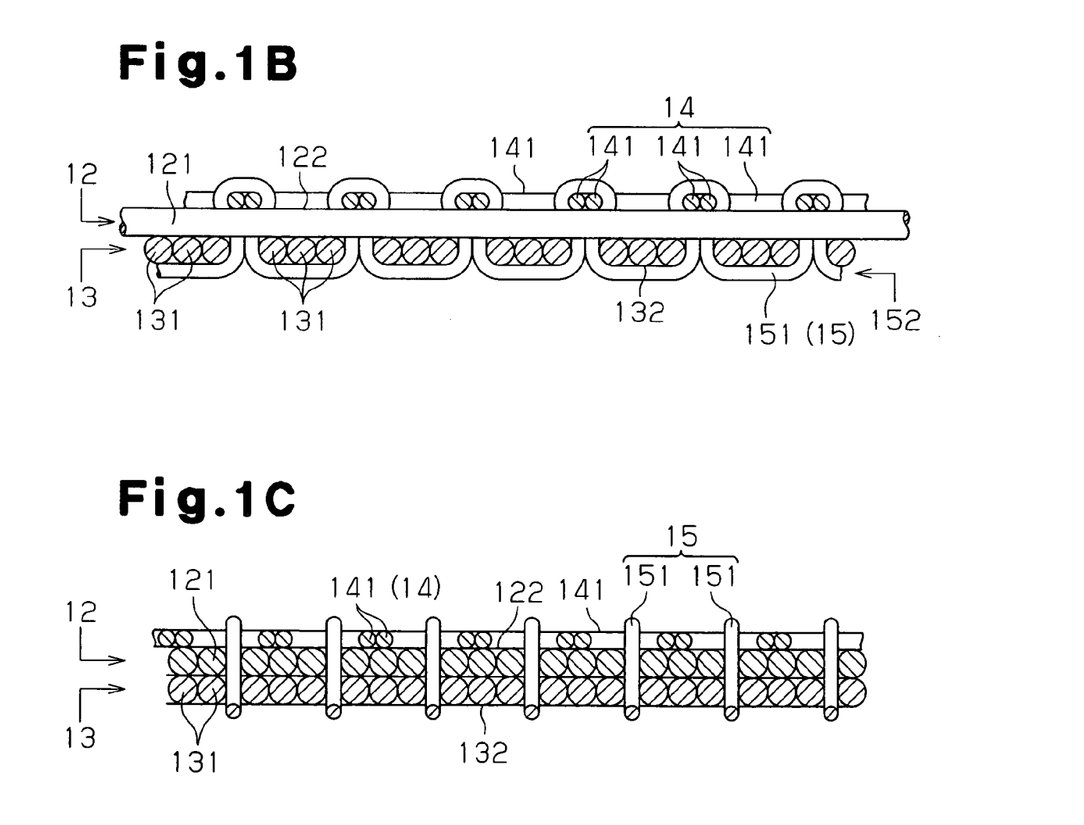
FIG. 1B is a cross-sectional view taken along a line IB-IB in FIG. 1A.
FIG. 1C is a cross-sectional view taken along a line IC-IC in FIG. 1A.

As shown in FIGS. 1A to 1C, a fiber fabric 11 is structured by a first fiber layer 12 formed of a plurality of first fiber bundles 121, a second fiber layer 13 formed of a plurality of second fiber bundles 131, a retaining thread group 14 formed of a plurality of retaining threads 141, and a constraint thread group 15 formed of a plurality of constraint threads 151. The first fiber layer 12 is laminated in adjacent to the second fiber layer 13. The constraint threads 151 extend in a thickness direction of the fiber fabric 11 and pass through the first fiber layer 12 and the second fiber layer 13. The retaining threads 141 intersect the constraint threads 151. An array pitch of the retaining threads 141 and the constraint threads 151 is set to be wider than an array pitch of the first fiber bundles 121 and the second fiber bundles 131. The threads in this case are not limited to the twisted threads, but include fiber bundles in which a lot of fibers are bundled but are not twisted.

Figure 2A:
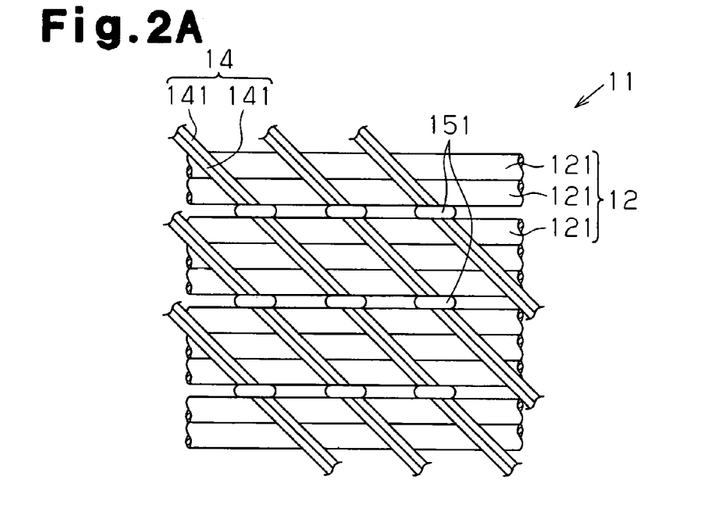
FIG. 2A is a view showing one surface of the fiber fabric in FIG. 1A.
Figure 2B:
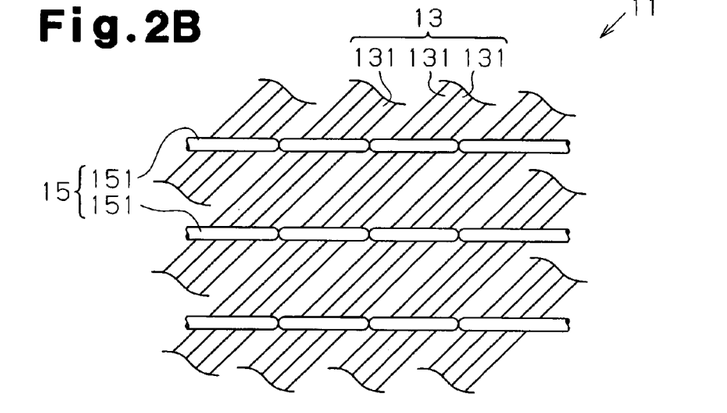
FIG. 2B is a view showing the other surface of the fiber fabric in FIG. 1A.
Figure 2C:
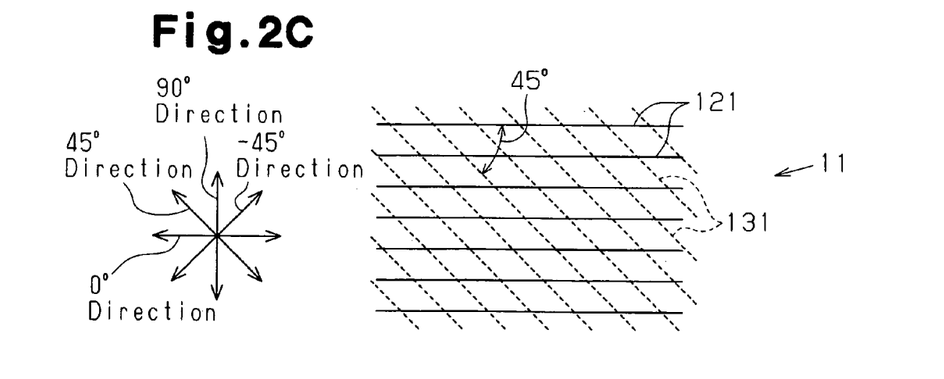
FIG. 2C is a schematic view showing one surface of the fiber fabric in FIG. 1A.

As shown in FIGS. 2A and 2C, all the first fiber bundles 121 are aligned in one direction. That is, length directions of all the first fiber bundles 121 are aligned in the same direction. Hereinafter, the length direction of the first fiber bundles 121 is described as a 0 degree direction corresponding to a reference direction. All the retaining threads 141 are aligned in one direction which is different from the length direction of the first fiber bundles 121. That is, on the assumption that a direction component of the retaining threads 141 to a direction in which the layers of the first and second fiber layers 12 and 13 are expanded (hereinafter, simply referred to as a layer direction) is a length direction of the retaining threads 141, the length direction of the retaining threads 141 intersects the length direction of the first fiber bundles 121 at an angle of 45 degrees. Hereinafter, the length direction of the retaining threads 141 is described as a 45 degree direction. In this case, FIG. 2A expresses the fiber fabric 11 only by the first fiber bundles 121, the retaining threads 141 and the constraint threads 151 for easily understanding, and FIG. 2C is a schematic view expressing the fiber fabric 11 only by the first fiber bundles 121 and the second fiber bundles 131.

As shown in FIGS. 2B to 2C, all the second fiber bundles 131 are aligned in one direction which is different from the length direction of the first fiber bundles 121 and the length direction of the retaining threads 141. That is, length directions of all the second fiber bundles 131 are aligned in the same direction. The length direction of the second fiber bundles 131 intersects the length direction of the first fiber bundles 121 at an angle of 45 degrees. That is, the length direction of the second fiber bundles 131 is aligned with the length direction of the retaining threads 141. Hereinafter, the length direction of the second fiber bundles 131 is expressed as a 45 degree direction. On the assumption that a direction component of the constraint threads 151 in the layer direction of the first and second fiber layers 12 and 13 is the length direction of the constraint threads 151, the length direction of all the constraint threads 151 are aligned with the length direction of the first fiber bundles 121. In this case, FIG. 2B expresses the fiber fabric 11 only by the second fiber bundles 131 and the constraint threads 151.

Each of the first fiber bundles 121, the second fiber bundles 131, the retaining threads 141, and the constraint threads 151 is formed of continuous fibers. In the present embodiment, the numbers of the continuous fibers of the first fiber bundles 121 and the second fiber bundles 131 are respectively about 12000, and the numbers of the continuous fibers of the retaining threads 141 and the constraint threads 151 are respectively about 2000.

As shown in FIG. 1B, the constraint threads 151 extending in the thickness direction of the fiber fabric 11 and passing through the first fiber layer 12 and the second fiber layer 13 are folded back so as to straddle the retaining threads 141 on a first layer surface 122 (an upper surface in FIG. 1B) of the first fiber layer 12. The constraint threads 151 are again inserted to the first fiber layer 12 and the second fiber layer 13 at the next insertion position which is away from a certain one insertion position at the array pitch of the constraint threads 151, on a first layer surface 132 (a lower surface in FIG. 1B) of the second fiber layer 13. A portion (hereinafter, referred to as a layer portion 152) of the constraint threads 151 existing on the first layer surface 132 of the second fiber layer 13 is directed to the length direction of the first fiber bundles 121. That is, the portions of the constraint threads 151 in the layer portion 152 are aligned in the length direction (the 0 degree direction) of the first fiber bundles 121. Hereinafter, the length direction of the constraint thread group 15 is expressed as a 0 degree direction.

The retaining thread group 14 and the constraint thread group 15 form a woven texture, and the woven texture holds the first fiber layer 12 and the second fiber layer 13 between the retaining thread group 14 and the constraint thread group 15. The first fiber layer 12 and the second fiber layer 13 constitute a main body of the fiber fabric 11, the length direction of the first fiber bundles 121 is the 0 degree direction, and the length direction of the second fiber bundles 131 is the 45 degree direction. Hereinafter, the length directions of the first fiber bundles 121 and the second fiber bundles 131 of the fiber fabric 11 are expressed as a set, and are expressed by (0 degrees, 45 degrees).

The fiber fabric 11 mentioned above is manufactured, for example, as follows.

Figure 3A:
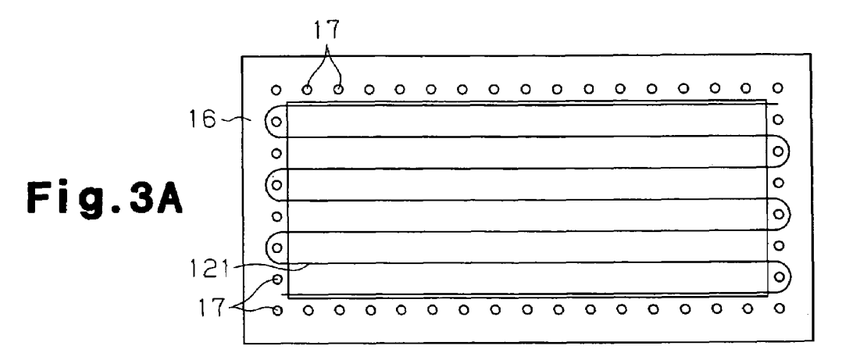
FIGS. 3A and 3B are plan views explaining manufacturing steps of the fiber fabric in FIG. 1A.
Figure 3B:
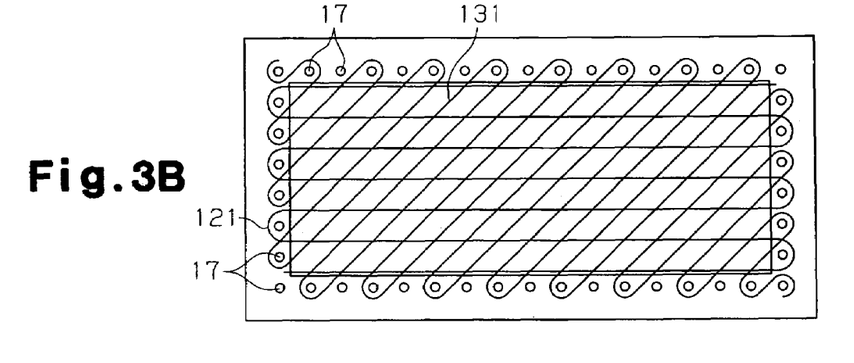

As shown in FIG. 3A, the first fiber layer 12 is formed by folding back and engaging the first fiber bundles 121 with a lot of pins 17 detachably provided in a rising manner in a rectangular frame body 16 at a predetermined pitch. Next, as shown in FIG. 3B, the second fiber layer 13 is formed on the first fiber layer 12 by folding back and engaging the second fiber bundles 131 with the pins 17.

Next, the constraint threads 151 are inserted to the second fiber layer 13 and the first fiber layer 12, for example, in accordance with a method disclosed in Japanese Laid-Open Patent Publication No. 8-218249. That is, insertion needles are inserted along the thickness directions of the second fiber layer 13 and the first fiber layer 12, in a state in which the constraint threads 151 are each locked to a hole formed in a leading end of the insertion needle. The insertion needles are moved forward to a position in which the holes of the insertion needles pass through the second fiber layer 13 and the first fiber layer 12. Thereafter, the insertion needles are moved backward slightly, and the constraint threads 151 are in a state of forming U-shaped loops. Next, retaining threads needles are stopped at a time when the retaining threads needles are passed within the U-shaped loops, and reach the end portions of the second fiber layer 13 and the first fiber layer 12. At this time, the retaining threads 141 are locked to leading ends of the retaining threads needle. Further, the retaining threads needles are pulled back, and the retaining threads 141 are in a state of being inserted into the U-shaped loops of the constraint threads 151. In this state, the insertion needles are pulled back. Accordingly, the retaining threads 141 are fastened by the constraint threads 151, and the fiber fabric 11 is manufactured.

Figure 4A:
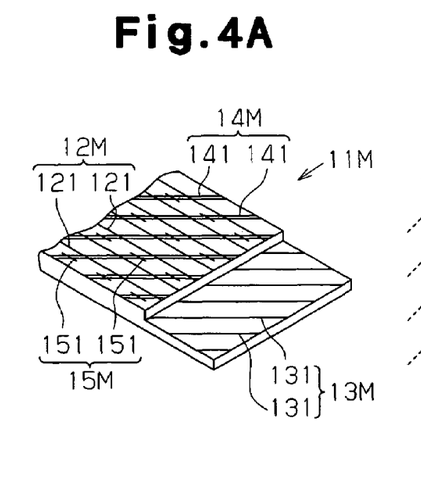
FIG. 4A is a partially cut away schematic perspective view of a fiber fabric which is mirror symmetrical to the fiber fabric in FIG. 1A.
Figure 4B:
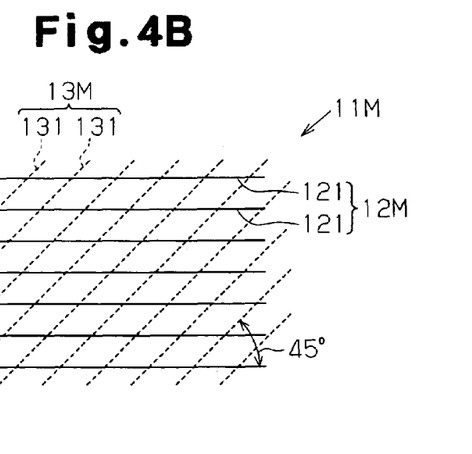
FIG. 4B is a schematic view showing one surface of the fiber fabric in FIG. 4A.

A mirror fiber fabric 11M shown in FIGS. 4A and 4B is structured by a first fiber layer 12M formed of a plurality of first fiber bundles 121, a second fiber layer 13M formed of a plurality of second fiber bundles 131, a retaining thread group 14M formed of a plurality of retaining threads 141, and a constraint thread group 15M formed of a plurality of constraint threads 151. FIG. 4B is a schematic view showing the mirror fiber fabric 11M only by the first fiber bundles 121 and the second fiber bundles 131. A length direction of the second fiber bundles 131 of the mirror fiber fabric 11M intersects a length direction (the 0 degree direction) of the first fiber bundles 121 of the mirror fiber fabric 11M at an angle of 45 degrees. A length direction of the second fiber bundle 131 of the mirror fiber fabric 11M coincides with the length direction of the first fiber layer 12 at a time of rotating only the first fiber layer 12 in the fiber fabric 11 at 90 degrees. Hereinafter, the length direction of the second fiber bundles 131 of the mirror fiber fabric 11M is expressed as a −45 degree direction. The mirror fiber fabric 11M has a mirror symmetrical relation to the fiber fabric 11. The mirror symmetrical relation in this case means a mirror symmetrical relation with respect to the length directions of the first fiber bundles 121 and the second fiber bundles 131. That is, the mirror fiber fabric 11M having the mirror symmetrical relation to the fiber fabric 11 is included in the present invention.

The length direction of the first fiber bundles 121 of the first fiber layer 12M corresponding to a main body of the mirror fiber fabric 11M is the 0 degree direction, and the length direction of the second fiber bundles 131 of the second fiber layer 13M corresponding to a main body of the mirror fiber fabric 11M is the −45 degree direction. Hereinafter, the length directions of the first and second fiber bundles 121 and 131 of the mirror fiber fabric 11M are expressed by 0 degrees, −45 degrees).

In this case, for example, a carbon fiber and a glass fiber are employed for the first fiber bundles 121 and the second fiber bundles 131. For example, polyester and glass fiber are employed for the retaining threads 141 and the constraint threads 151.

Figures 5A, 5B:
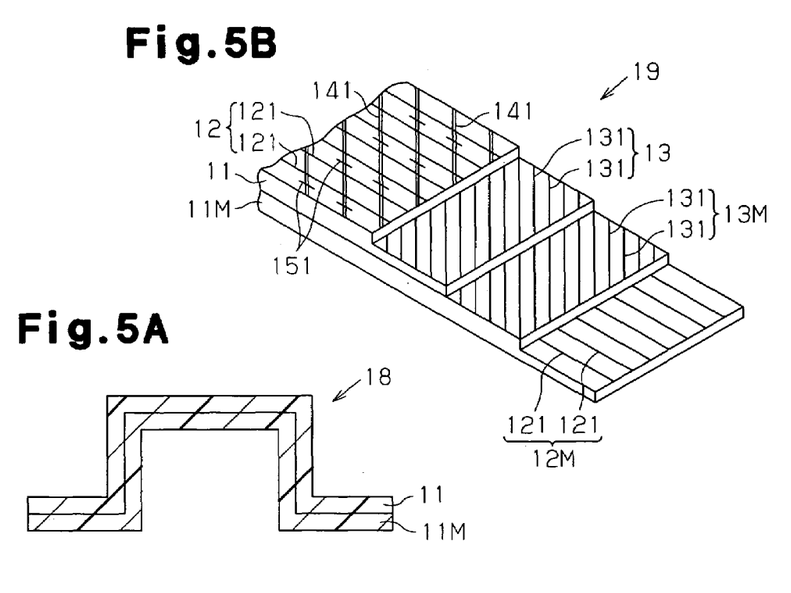
FIG. 5A is a cross-sectional view of a bumper reinforcement formed of the fiber fabric in FIG. 1A and the fiber fabric in FIG. 4A.
FIG. 5B is a partially cut away schematic perspective view of an overlapped sheet formed of the fiber fabric in FIG. 1A and the fiber fabric in FIG. 4A.

FIG. 5A shows a bumper reinforcement 18 structured by lapping the fiber fabric 11 over the mirror fiber fabric 11M and made of a fiber reinforced resin. FIG. 5B shows an overlapped sheet 19 obtained by lapping the fiber fabric 11 over the mirror fiber fabric 11M. The mirror fiber fabric 11M in the overlapped sheet 19 is lapped over the fiber fabric 11 by being reversed (reversed right and left) from a state shown in FIGS. 4A and 4B. The fiber fabric 11 and the mirror fiber fabric 11M constituting the bumper reinforcement 18 are in a mirror symmetrical overlapped state. As the resin, a thermosetting resin such as an epoxy resin, polyester or the like is employed.

In the bumper reinforcement 18 corresponding to the composite material, the fiber fabrics 11 and 11M are used such that the first fiber bundles 121 extends in the longitudinal direction of the bumper reinforcement 18.

The first embodiment has the following advantages.

(1) Since the first fiber layers 12 and 12M and the second fiber layers 13 and 13M have no crimp, the fiber fabrics 11 and 11M are advantageous for increasing the strength of the composite material (the bumper reinforcement 18 in the present embodiment) made of the fiber reinforced resin, and give excellent moldability. Further, since the fiber fabrics 11 and 11M are formed of the two-layered fiber fabric in which two layers comprising the first fiber layers 12 and 12M and the second fiber layers 13 and 13M are laminated with each other, a production efficiency of the overlapped sheet 19 in which the thickness is increased by overlapping the fiber fabrics 11 and 11M is improved more than the case of the fiber fabric having a single-layer structure.

(2) The retaining threads 141 brought into contact with the layer surface 122 of the first fiber layer 12 are aligned in the length direction of the second fiber bundles 131 of the second fiber layer 13. Since the first fiber bundles 121 of the first fiber layer 12 diagonally intersect the second fiber bundles 131 of the second fiber layer 13, the retaining threads 141 cannot fail to intersect the first fiber bundles 121 of the first fiber layer 12 brought into contact with the retaining threads 141 in the layer surface 122. In the same manner, the retaining threads 141 brought into contact with the layer surface 122 of the first fiber layer 12M are aligned in the length direction of the second fiber bundles 131 of the second fiber layer 13M. That is, the retaining threads 141 of the retaining thread group 14M cannot fail to intersect the first fiber bundles 121 of the first fiber layer 12M brought into contact with the retaining threads 141 in the layer surface 122.

On the other hand, the constraint threads 151 in the layer portion 152 of the constraint thread group 15 brought into contact with the first layer surface 132 of the second fiber layer 13 are aligned in the direction of the first fiber bundles 121 of the first fiber layer 12. The first fiber bundles 121 of the first fiber layer 12 diagonally intersect the second fiber bundles 131 of the second fiber layer 13. Accordingly, the constraint threads 151 in the layer portion 152 cannot fail to intersect the second fiber bundles 131 of the second fiber layer 13 brought into contact with the layer portions 152 in the first layer surfaces 132. In the same manner, the constraint threads 151 of the constraint thread group 15M cannot fail to intersect the second fiber bundles 131 of the second fiber layer 13M brought into contact with the constraint threads 151 in the first layer surface 132.

Accordingly, the first fiber layer 12 and the second fiber layer 13 sandwiched between the retaining thread group 14 and the layer portion 152 of the constraint thread group 15 are well held by a constraining effect on the basis of a cooperation of the retaining threads 141 and the constraint threads 151, in such a manner as to prevent the array of the fiber bundles from being disturbed.

In the structure in which the length direction of the retaining threads 141 is aligned with the length direction of the second fiber bundles 131, and the length direction of the constraint threads 151 is aligned with the length direction of the first fiber bundles 121, the number of the fiber directions in the fiber fabric is only two. Accordingly, the structure in which the length direction of the retaining threads 141 brought into contact with the first fiber layer 12 is aligned with the length direction of the second fiber bundles 131, and the length direction of the constraint threads 151 brought into contact with the second fiber layer 13 via the layer portion 152 is aligned with the length direction of the first fiber bundles 121 is optimum for obtaining an excellent moldability.

(3) It is possible to increase the strength of the bumper reinforcement 18 by enlarging a wall thickness of the bumper reinforcement 18. In order to enlarge the wall thickness, it is preferable to overlap a plurality of fiber fabrics 11, overlap a plurality of mirror fiber fabrics 11M or lap the fiber fabric 11 over the mirror fiber fabric 11M. In particular, the overlapped sheet 19 obtained by overlapping the fiber fabric 11 [the fiber fabric in which the length directions of the first and second fiber bundles 121 and 131 are (0 degrees, 45 degrees)] and the mirror fiber fabric 11M [the fiber fabric in which the length directions of the first and second fiber bundles 121 and 131 are (0 degrees, 45 degrees)] having the mirror symmetrical relation with each other so as to be mirror symmetrical is preferable for obtaining the composite material (the bumper reinforcement 18) having no warp. The length direction of the first and second fiber bundles 121 and 131 of the fiber fabric obtained by reversing the mirror fiber fabric 11M becomes (45 degrees, 0 degrees). The length direction of the first and second fiber bundles 121 and 131 of the overlapped sheet 19 obtained by overlapping the fiber fabric in which the length directions of the first and second fiber bundles 121 and 131 are (45 degrees, 0 degrees), and the fiber fabric 11 in which the length directions of the first and second fiber bundles 121 and 131 are (0 degrees, 45 degrees) becomes (0 degrees, 45 degrees, 45 degrees, 0 degrees).

(4) The fiber fabric obtained by combining the −45 degree direction and the 0 degree direction [the fiber fabric in which the length directions of the first and second fiber bundles 121 and 131 are (−45 degrees, 0 degrees)] is obtained by reversing [reversing right and left in FIG. 2A] the fiber fabric 11 in which the length directions of the first and second fiber bundles 121 and 131 are (0 degrees, 45 degrees). Further, the fiber fabric obtained by combining the 90 degree direction and the −45 degree direction [the fiber fabric in which the length directions of the first and second fiber bundles 121 and 131 are (90 degrees, −45 degrees)] is obtained by rotating the fiber fabric 11 obtained by combining the 0 direction and the 45 direction. The fiber fabric obtained by combining the 45 degree direction and the 90 degree direction [the fiber fabric in which the length directions of the first and second fiber bundles 121 and 131 are (45 degrees, 90 degrees)] is obtained by rotating the fiber fabric in which the length directions of the first and second fiber bundles 121 and 131 are (−45 degrees, 0 degrees), or reversing the fiber fabric in which the length directions of the first and second fiber bundles 121 and 131 are (90 degrees, −45 degrees).

For example, it is assumed that the length direction of one of the first fiber bundle 121 and the second fiber bundle 131 is 0 degrees. In this case, the fiber fabric provided with the first fiber bundles 121 and the second fiber bundles 131 diagonally intersecting with each other at an angle of 45 degrees provide the fiber fabric in which the combinations in the length directions are different, in which the length direction of any one of the first fiber bundles 121 and the second fiber bundles 131 becomes the 0 degree direction or the 90 degree direction, and the direction of the other becomes 45 degrees or −45 degrees, by being reversed, rotated at −45 degrees or rotated at 90 degrees.

In the same manner, the fiber fabric in which the 45 degree direction and the 0 degree direction are combined [the fiber fabric in which the length directions of the first and second fiber bundles 121 and 131 are (45 degrees, 0 degree s)] is provided by combining the 0 degree direction and the −45 degree direction, that is, reversing the mirror fiber fabric 11M in which the length directions of the first and second fiber bundles 121 and 131 are (0 degrees, −45 degrees). Further, the fiber fabric in which the 90 degree direction and the 45 degree direction are combined [the fiber fabric in which the length directions of the first and second fiber bundles 121 and 131 are (90 degrees, 45 degrees)] by rotating the mirror fiber fabric 11M in which the 0 degree direction and the −45 degree direction are combined. The fiber fabric in which the −45 degree direction and the 90 degree direction are combined [the fiber fabric in which the length directions of the first and second fiber bundles 121 and 131 are (−45 degrees, 90 degrees)] is provided by rotating the fiber fabric in which the length directions of the first and second fiber bundles 121 and 131 are (45 degrees, 0 degrees) at 90 degrees, or reversing the fiber fabric in which the length directions of the first and second fiber bundles 121 and 131 are (90 degrees, 45 degrees).

For example, in order to form the overlapped sheet in which the length directions of the first and second fiber bundles 121 and 131 are (0 degrees, 45 degrees, 90 degrees, −45 degrees, −45 degrees, 90 degrees, 45 degrees, 0 degrees), it is preferable to execute as follows. First, a first overlapped sheet S1 is formed by overlapping the fiber fabric 11 [in which the length directions of the first and second fiber bundles 121 and 131 are (0 degrees, 45 degrees)], and the fiber fabric [in which the length directions of the first and second fiber bundles 121 and 131 are (90 degrees, −45 degrees)] obtained by rotating the fiber fabric 11 at 90 degrees. Further, a second overlapped sheet S2 is formed by overlapping the mirror fiber fabric 11M [in which the length directions of the first and second fiber bundles 121 and 131 are (0 degrees, −45 degrees)], and the fiber fabric [in which the length directions of the first and second fiber bundles 121 and 131 are (90 degrees, 45 degrees)] obtained by rotating the mirror fiber fabric 11M at 90 degrees. The second overlapped sheet S2 has a mirror symmetrical relation with respect to the first overlapped sheet S1. Further, an overlapped sheet in which the length directions of the first and second fiber bundles 121 and 131 are (0 degrees, 45 degrees, 90 degrees, −45 degrees, −45 degrees, 90 degrees, 45 degrees, 0 degrees) can be obtained by overlapping the first overlapped sheet S1 [in which the length directions of the first and second fiber bundles 121 and 131 are (0 degrees, 45 degrees, 90 degrees, −45 degrees)], and the overlapped sheet obtained by reversing the second overlapped sheet [in which the length directions of the first and second fiber bundles 121 and 131 are (−45 degrees, 90 degrees, 45 degrees, 0 degrees)].

The overlapped sheet obtained by overlapping the first and second overlapped sheets S1 and S2 having the mirror symmetrical relation in a mirror symmetrical manner is preferable for forming the composite material generating no warp. The fiber fabrics 11 and 11M obtained by diagonally intersecting the first fiber bundles 121 with the second fiber bundles 131 at 45 degrees make it possible to manufacture the first and second overlapped sheets S1 and S2 having the mirror symmetrical relation. That is, the fiber fabric 11 in which the length directions of the first and second fiber bundles 121 and 131 are (0 degrees, 45 degrees), and the mirror fiber fabric 11M in which the length directions of the first and second fiber bundles 121 and 131 are (0 degrees, −45 degrees) are preferable for a raw material of the overlapped sheet for constituting the composite material having a large thickness.

The present invention may be modified as follows.

Figure 6A:
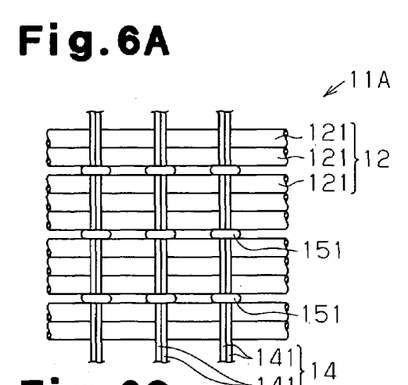
FIG. 6A is a view showing one surface of a fiber fabric in accordance with a second embodiment of the present invention.
Figure 6B:
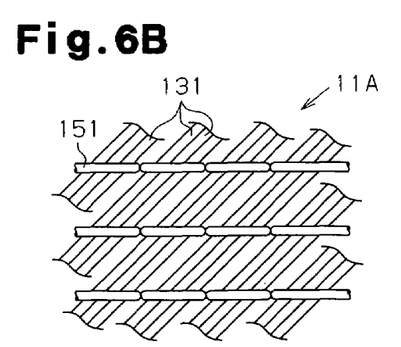
FIG. 6B is a view showing the other surface of the fiber fabric in FIG. 6A.
Figure 6C:
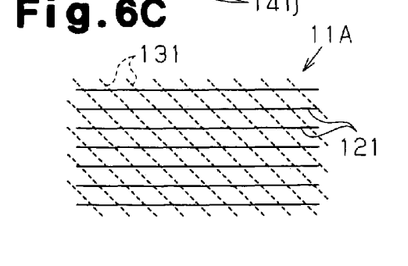
FIG. 6C is a schematic view showing one surface of the fiber fabric in FIG. 6A.
Figure 6D:
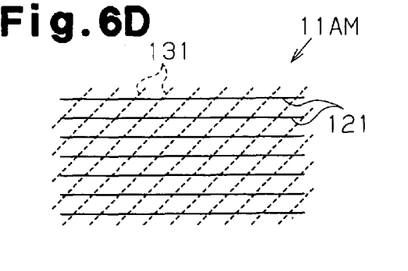
FIG. 6D is a schematic view showing one surface of a fiber fabric which is mirror symmetrical to the fiber fabric in FIG. 6C.

As shown in FIGS. 6A to 6C, the structure may be made such that the retaining threads 141 intersect the first fiber bundles 121 at an angle of 90 degrees. The length directions of the first fiber bundles 121, the second fiber bundles 131 and the constraint threads 151 constituting the fiber fabric 11A are the same as the case of the first embodiment. FIG. 6D shows a mirror fiber fabric 11AM having a mirror symmetrical relation to the fiber fabric 11A.

Figure 7A:
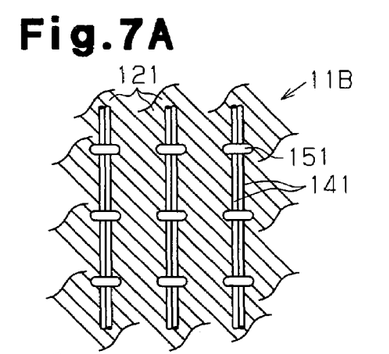
FIG. 7A is a view showing one surface of a fiber fabric in accordance with a third embodiment of the present invention.
Figure 7B:
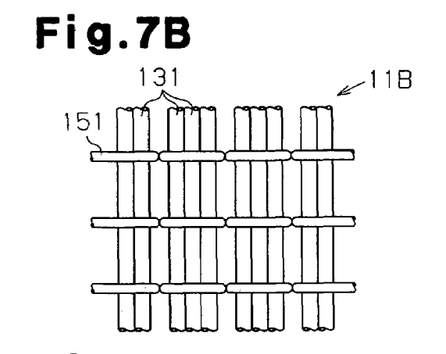
FIG. 7B is a view showing the other surface of the fiber fabric in FIG. 7A.
Figure 7C:
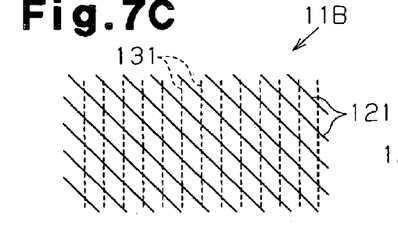
FIG. 7C is a schematic view showing one surface of the fiber fabric in FIG. 7A.
Figure 7D:
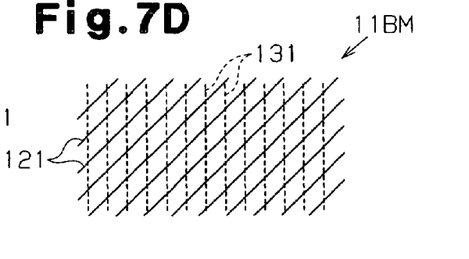
FIG. 7D is a schematic view showing one surface of a fiber fabric which is mirror symmetrical to the fiber fabric in FIG. 7C.

As shown in FIGS. 7A to 7C, the structure may be made such that the length direction of the first fiber bundles 121 is the 45 degree direction, and the length direction of the second fiber bundles 131 is the 90 degree direction. The length directions of the retaining threads 141 and the constraint threads 151 constituting the fiber fabric 11B are the same as the case of the first embodiment. FIG. 7D shows a mirror fiber fabric 11BM having a mirror symmetrical relation to the fiber fabric 11B.

Figure 8A:
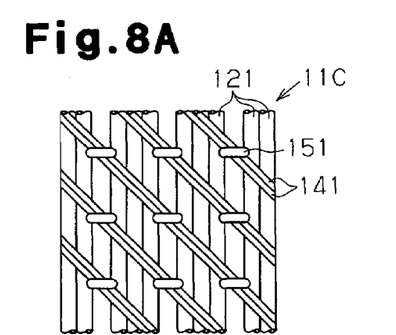
FIG. 8A is a view showing one surface of a fiber fabric in accordance with a fourth embodiment of the present invention.
Figure 8B:
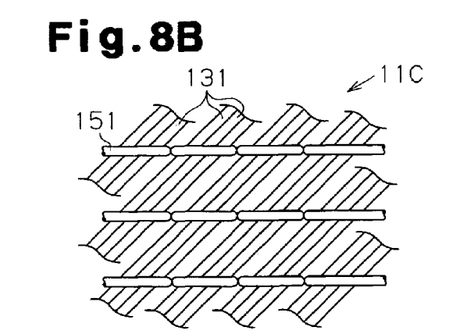
FIG. 8B is a view showing the other surface of the fiber fabric in FIG. 8A.
Figure 8C:
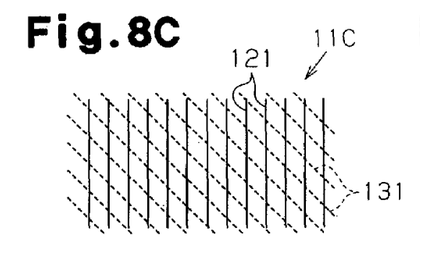
FIG. 8C is a schematic view showing one surface of the fiber fabric in FIG. 8A.
Figure 8D:
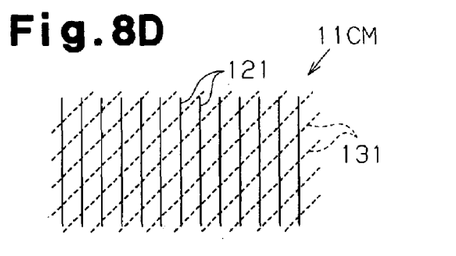
FIG. 8D is a schematic view showing one surface of a fiber fabric which is mirror symmetrical to the fiber fabric in FIG. 8C.

As shown in FIGS. 8A to 8C, the structure may be made such that the length direction of the first fiber bundles 121 is the 90 degree direction, and the length direction of the second fiber bundles 131 is the 45 degree direction. The length directions of the retaining threads 141 and the constraint threads 151 constituting the fiber fabric 11C are the same as the case of the first embodiment. FIG. 8D shows a mirror fiber fabric 11CM having a mirror symmetrical relation to the fiber fabric 11C.

Figure 9A:
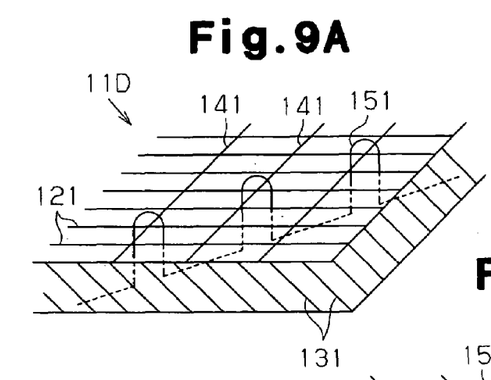
FIG. 9A is a brief perspective view of a fiber fabric in accordance with another embodiment of the present invention.
Figure 9B:
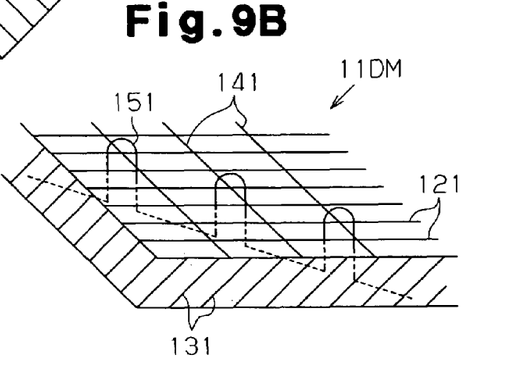
FIG. 9B is a brief perspective view of a fiber fabric which is mirror symmetrical to the fiber fabric in FIG. 9A.

As shown in FIG. 9A, the structure may be made such that the length direction of the constraint threads 151 is the −45 degree direction. The length directions of the first fiber bundles 121, the second fiber bundles 131 and the retaining threads 141 constituting the fiber fabric 11D are the same as the case of the first embodiment. FIG. 9B shows a mirror fiber fabric 11DM having a mirror symmetrical relation to the fiber fabric 11D.

Figure 10A:
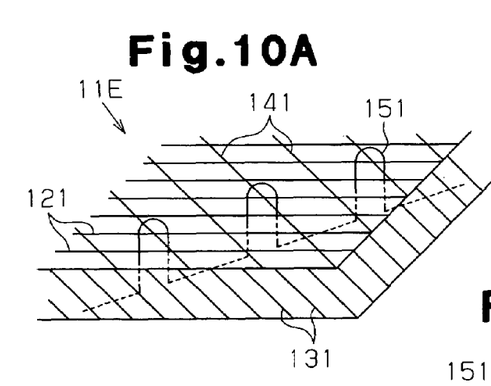
FIG. 10A is a brief perspective view of a fiber fabric in accordance with a further embodiment of the present invention.
Figure 10B:
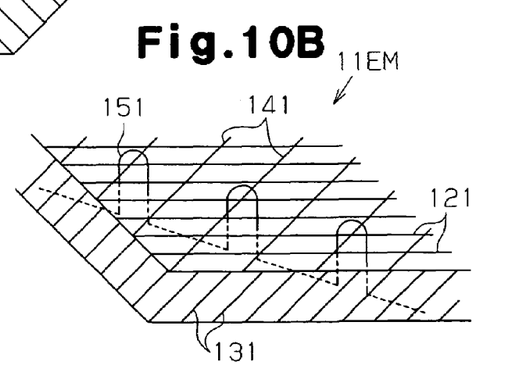
FIG. 10B is a brief perspective view of a fiber fabric which is mirror symmetrical to the fiber fabric in FIG. 10A.

As shown in FIG. 10A, the structure may be made such that the length direction of the constraint threads 151 is the. −45 degree direction. The length directions of the first fiber bundles 121, the second fiber bundles 131 and the retaining threads 141 constituting the fiber fabric 11E are the same as the case of the second embodiment. FIG. 10B shows a mirror fiber fabric 11EM having a mirror symmetrical relation to the fiber fabric 11E.

Figure 11A:
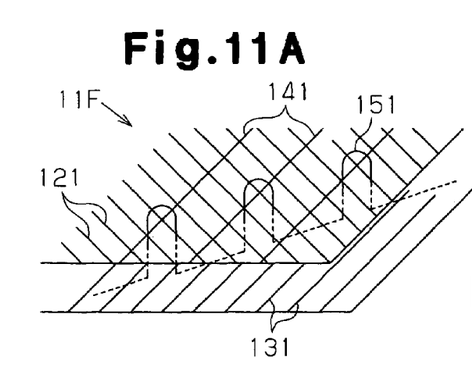
FIG. 11A is a brief perspective view of a fiber fabric in accordance with a further embodiment of the present invention.
Figure 11B:
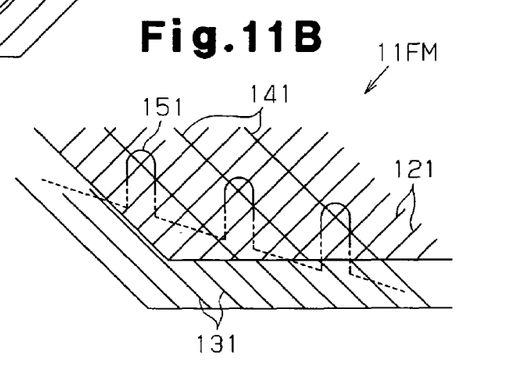
FIG. 11B is a brief perspective view of a fiber fabric which is mirror symmetrical to the fiber fabric in FIG. 11A.

As shown in FIG. 11A, the structure may be made such that the length direction of the constraint threads 151 is the −45 degree direction. The length directions of the first fiber bundles 121, the second fiber bundles 131 and the retaining threads 141 constituting the fiber fabric 11F are the same as the case of the third embodiment. FIG. 11B shows a mirror fiber fabric 11FM having a mirror symmetrical relation to the fiber fabric 11D.

Figures 12A, 12B:
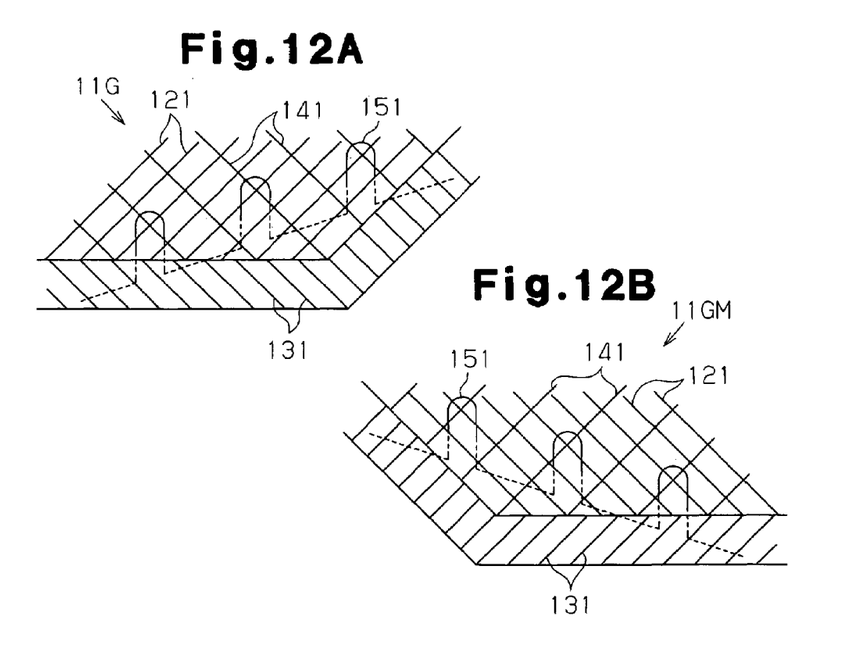
FIG. 12A is a brief perspective view of a fiber fabric in accordance with a further embodiment of the present invention.
FIG. 12B is a brief perspective view of a fiber fabric which is mirror symmetrical to the fiber fabric in FIG. 12A.

As shown in FIG. 12A, the structure may be made such that the length direction of the constraint threads 151 is the −45 degree direction. The length directions of the first fiber bundles 121, the second fiber bundles 131 and the retaining threads 141 constituting the fiber fabric 11G are the same as the case of the fourth embodiment. FIG. 12B shows a mirror fiber fabric 11GM having a mirror symmetrical relation to the fiber fabric 11G.

Figures 13A, 13B:
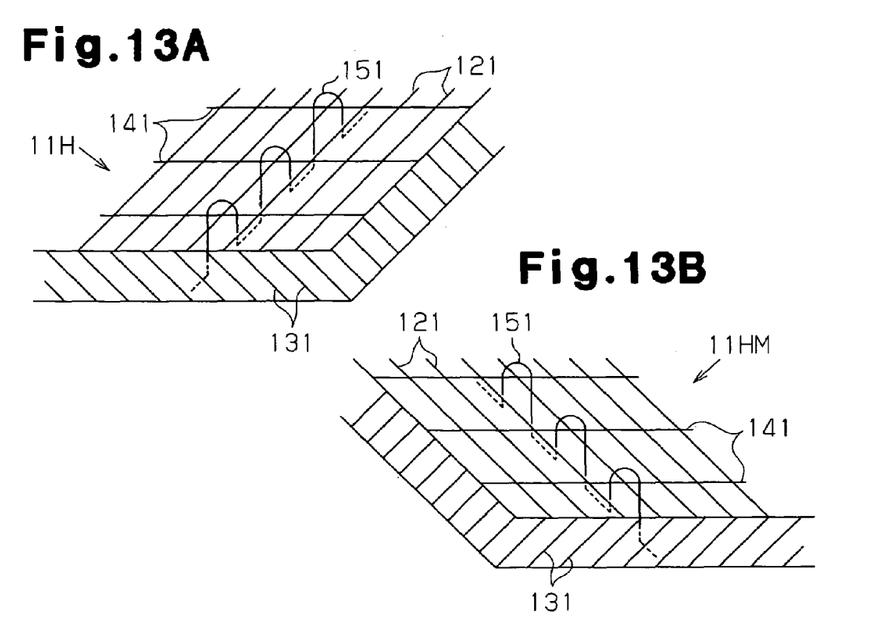
FIG. 13A is a brief perspective view of a fiber fabric in accordance with a further embodiment of the present invention.
FIG. 13B is a brief perspective view of a fiber fabric which is mirror symmetrical to the fiber fabric in FIG. 13A.

As shown in FIG. 13A, the structure may be made such that the length direction of the constraint threads 151 is the 90 degree direction. The length directions of the first fiber bundles 121, the second fiber bundles 131 and the retaining threads 141 constituting the fiber fabric 11H are the same as the case of the first embodiment. FIG. 13B shows a mirror fiber fabric 11HM having a mirror symmetrical relation to the fiber fabric 11H.

Figures 14A, 14B:
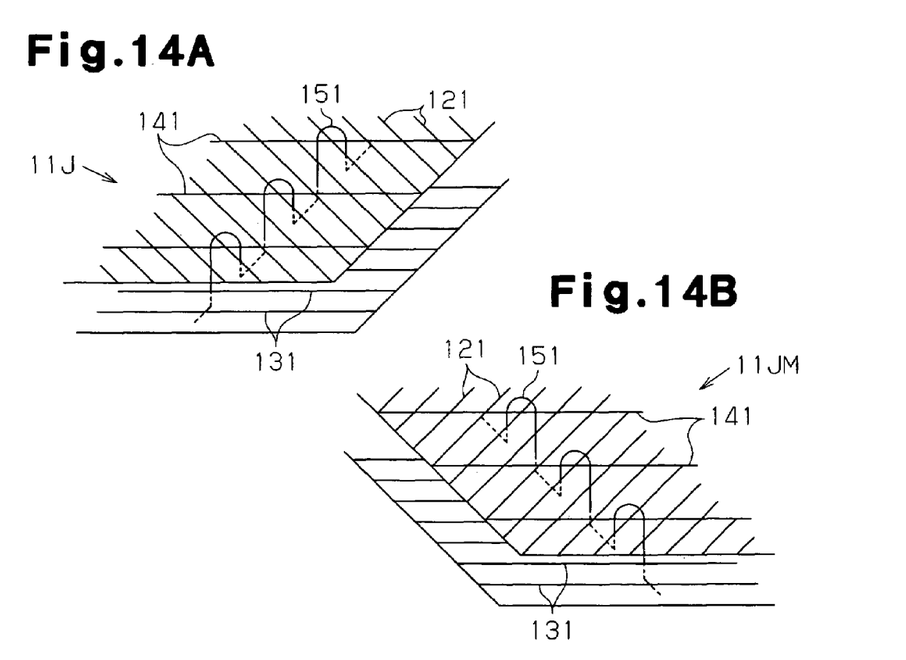
FIG. 14A is a brief perspective view of a fiber fabric in accordance with a further embodiment of the present invention.
FIG. 14B is a brief perspective view of a fiber fabric which is mirror symmetrical to the fiber fabric in FIG. 14A.

As shown in FIG. 14A, the structure may be made such that the length direction of the constraint threads 151 is the 90 degree direction. The length direction of the first fiber bundles 121 constituting the fiber fabric 11J is the 45 degree direction, the length direction of the second fiber bundles 131 is the 0 degree direction, and the length direction of the retaining threads 141 is the 0 degree direction. FIG. 14B shows a mirror fiber fabric 11HM having a mirror symmetrical relation to the fiber fabric 11J.

Figure 15:
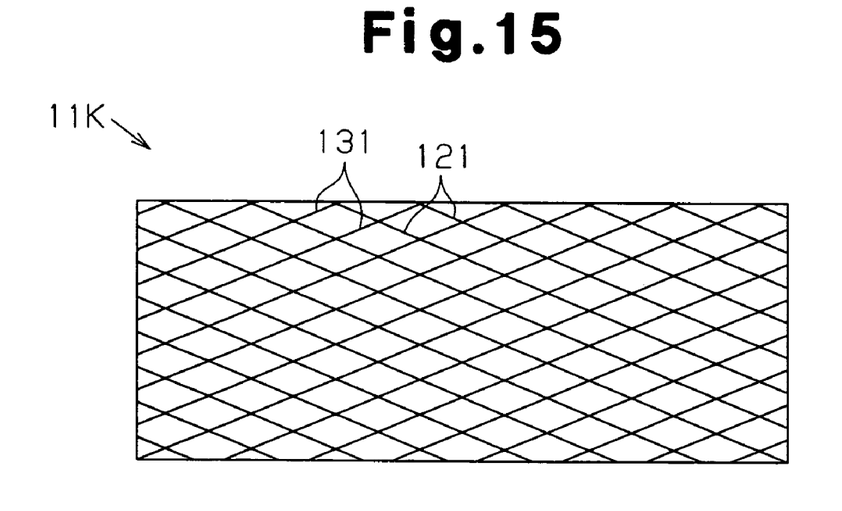
FIG. 15 is a schematic view showing a fiber fabric in accordance a further embodiment of the present invention.

As shown in FIG. 15, the structure may be made such that the length direction of one of the first fiber bundles 121 and the second fiber bundles 131 constituting the fiber fabric 11K is set to a 22.5 degree direction, and the other is set to a −22.5 degree direction.

For example, a case is considered below in which a beam is formed in such a manner that the first fiber bundles 121 diagonally intersect the second fiber bundles 131 at an angle of 22.5 degrees with respect to a longitudinal direction of the beam. In the case of using the fiber fabric 11 manufactured in a rectangular shape in the first embodiment, the beam having a necessary dimension is cut by cutting the fiber fabric 11 in a direction of 22.5 degrees with respect to the 0 degree direction of the first fiber bundles 121, and cutting in a direction of −67.5 degrees. However, in the case of cutting the beam having the necessary dimension from the fiber fabric 11 by cutting in the manner mentioned above, a lot of portions of the fiber fabric 11 will be of no use.

In the case of cutting a beam having the necessary dimension from the fiber fabric 11K manufactured in the rectangular shape as shown in FIG. 15, it is preferable to cut the fiber fabric 11K in the 0 direction and the 90 degree direction, and little useless portion is generated.

Figure 16:
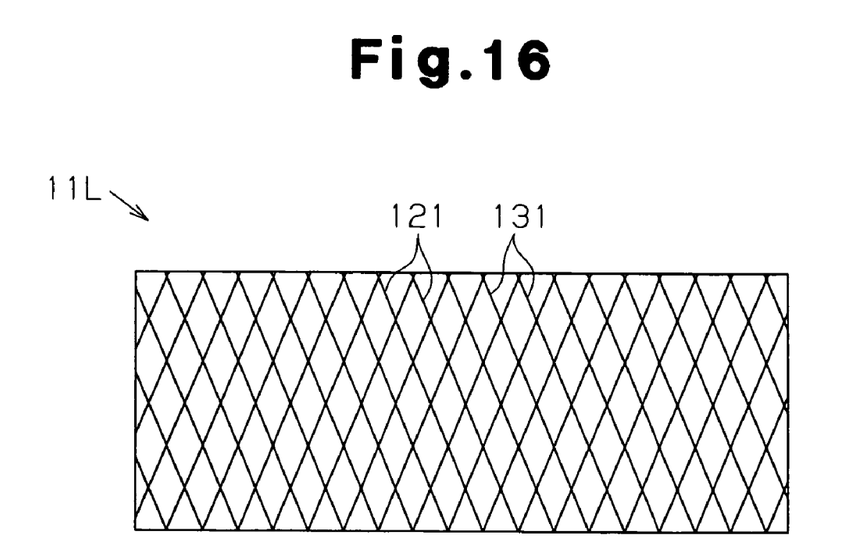
FIG. 16 is a schematic view showing a fiber fabric in accordance a further other embodiment of the present invention.

As shown in FIG. 16, the structure may be made such that the length direction of one of the first fiber bundles 121 and the second fiber bundles 131 constituting the fiber fabric 11L is set to a 67.5 degree direction, and the other is set to a −67.5 degree direction.

For example, a case is considered below in which a beam is formed in such a manner that the first fiber bundles 121 diagonally intersect the second fiber bundles 131 at an angle of 67.5 degrees with respect to a longitudinal direction of the beam. In the case of using the fiber fabric 11 manufactured in a rectangular shape in the first embodiment, the beam having a necessary dimension is cut by cutting the fiber fabric 11 in a direction of 67.5 degrees with respect to the 0 degree direction of the first fiber bundles 121, and cutting in a direction of −22.5 degrees. However, in the case of cutting the beam having the necessary dimension from the fiber fabric 11 by cutting in the manner mentioned above, a lot of portions of the fiber fabric 11 will be of no use.

In the case of cutting the necessary dimension from the fiber fabric 11L manufactured in the rectangular shape as shown in FIG. 16, it is preferable to cut the fiber fabric 11L in the 0 direction and the 90 degree direction, and little useless portion is generated.

The fiber kinds of the first fiber bundles 121 and the second fiber bundles 131 may be differentiated. For example, it is possible to employ a combination such that the first fiber bundles 121 are formed of the carbon fiber and the second fiber bundles 131 are formed of the glass fiber, or that the first fiber bundles 121 are formed of the aramid fiber and the second fiber bundles 131 are formed of the carbon fiber, or the like.

Although the multiple embodiments have been described herein, it will be clear to those skilled in the art that the present invention may be embodied in different specific forms without departing from the spirit of the invention. The invention is not to be limited to the details given herein, but may be modified within the scope and equivalence of the appended claims.

What is claimed is:

1. A composite material comprising:
    a first fiber fabric;
    a second fiber fabric having a mirror symmetric relation to the first fiber fabric and being overlapped to the first fiber fabric in a mirror symmetric manner; and
    a resin reinforced by the first and second fiber fabrics, wherein each of the first and second fiber fabrics comprising:
    a first fiber layer formed of a plurality of first fiber bundles having a mutually aligned length direction;
    a second fiber layer formed of a plurality of second fiber bundles having a mutually aligned length direction, the length direction of the second fiber bundles diagonally intersecting the first fiber bundles;
    a retaining thread group formed of a plurality of retaining threads having a mutually aligned length direction; and
    a constraint thread group formed of a plurality of constraint threads having a mutually aligned length direction, the length direction of the constraint threads intersecting the retaining threads,
    wherein the first fiber layer is laminated adjacent to the second fiber layer, and the retaining thread group and the constraint thread group form a woven texture so as to hold the first fiber layer and the second fiber layer together, and
    wherein the length direction of the retaining thread group is aligned with the length direction of the second fiber bundles and the length direction of the constraint thread group is aligned with the length direction of the first fiber bundles such that the number of fiber directions including the directions of the retaining and constraint thread groups in the first or second fiber fabric is only two.

2. The composite material according to claim 1, wherein the composite material comprising:
    a first overlapped sheet including the first fiber fabric and another fiber fabric overlapped to the first fiber fabric;
    a second overlapped sheet including the second fiber fabric and another fiber fabric overlapped to the second fiber fabric, the second overlapped sheet having a mirror symmetric relation to the first overlapped sheet and being overlapped to the first overlapped sheet in a mirror symmetric manner.

3. The composite material according to claim 1, wherein the retaining threads are brought into contact with a layer surface of one of the first fiber layer and the second fiber layer, and the length direction of the retaining threads is aligned with the length direction of the fiber bundles of the other one of the first fiber layer and the second fiber layer.

4. The composite material according to claim 1, wherein the constraint threads have a portion brought into contact with a layer surface of one of the first fiber layer and the second fiber layer, and a length direction of the portion is aligned with the length direction of the fiber bundles of the other one of the first fiber layer and the second fiber layer.

5. The composite material according to claim 1, wherein the retaining threads are brought into contact with a layer surface of one of the first fiber layer and the second fiber layer, the length direction of the retaining threads is aligned with the length direction of the fiber bundles of the other one of the first fiber layer and the second fiber layer, and the constraint threads has a portion brought into contact with a layer surface of said other one of the first fiber layer and the second fiber layer, and a length direction of the portion is aligned with the length direction of the fiber bundles of said one of the first fiber layer and the second fiber layer.

6. The composite material according to claim 1, wherein the length direction of the first fiber bundles diagonally intersects the length direction of the second fiber bundles at an angle of 45 degrees.

* * * * *